(12) United States Patent
Givan et al.

(10) Patent No.: US 6,601,683 B1
(45) Date of Patent: Aug. 5, 2003

(54) CARBON-CARBON CLUTCH BEARING ENGAGEMENT MECHANISM

(75) Inventors: Garry D. Givan, Springboro, OH (US); Nelson H. Forster, Bellbrook, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/609,947

(22) Filed: Jul. 3, 2000

(51) Int. Cl.⁷ .............................................. F16C 27/00
(52) U.S. Cl. ............................ 192/107 M; 192/110 B; 384/581
(58) Field of Search ........................ 192/107 M, 110 B; 384/517, 581; 415/170.1, 229; 310/90.5

(56) References Cited

U.S. PATENT DOCUMENTS

| | | | | |
|---|---|---|---|---|
| 4,641,978 A | * | 2/1987 | Kapich .................. | 310/90.5 X |
| 5,126,612 A | * | 6/1992 | Girault ...................... | 310/90.5 |
| 5,205,384 A | * | 4/1993 | Heshmat ................. | 384/581 X |
| RE36,363 E | * | 11/1999 | Tilton et al. ........... | 192/107 M |
| 6,153,958 A | * | 11/2000 | Hull et al. .................. | 310/90.5 |
| 6,194,801 B1 | * | 2/2001 | Goransson ................. | 310/90.5 |
| 6,261,061 B1 | * | 7/2001 | Pfaffenberger .............. | 415/229 |

OTHER PUBLICATIONS

Smalley Steel Ring Company web site www.ringspring.com/Spring.asp last modified May 3, 2000.

MiTi Developments, Mohawk Innovative Technology, Inc., vol. 5 Feb. 1999, Zero–Clearance Auxiliary Bearing Developed.

MiTi Developments, Mohawk Innovative Technology, Inc., vol. 7 May 1999, High Speed Auxiliary Bearing Demonstrated.

MiTi Developments, Mohawk Innovative Technology, Inc., vol. 8 Sep. 1999, Auxiliary Bearing Developed for 140 mm Shaft with 1000 Pound Load at 18,000 RPM!.

* cited by examiner

*Primary Examiner*—Rodney H Bonck
(74) *Attorney, Agent, or Firm*—Gary F. Grafel; Fredric L. Sinder; Thomas L. Kundert

(57) ABSTRACT

A bi-directional, conical carbon-carbon clutch bearing engagement mechanism for the inner race of a conventional rolling element bearing comprising a plurality of wave springs for axially urging the clutch into a non-engaged position, and a guide consisting of contiguous pairs of non-parallel ball raceways and a ball positioned in both pairs of the ball raceways whereby relative rotation of the ball raceway pairs in opposite directions results in axial movement of the clutch ring housings in opposing axial directions to an engaged position. The mechanism includes a pair of conical carbon-carbon rings mounted in the movable clutch ring housings conformed to engage opposing conical shaft runners.

16 Claims, 5 Drawing Sheets

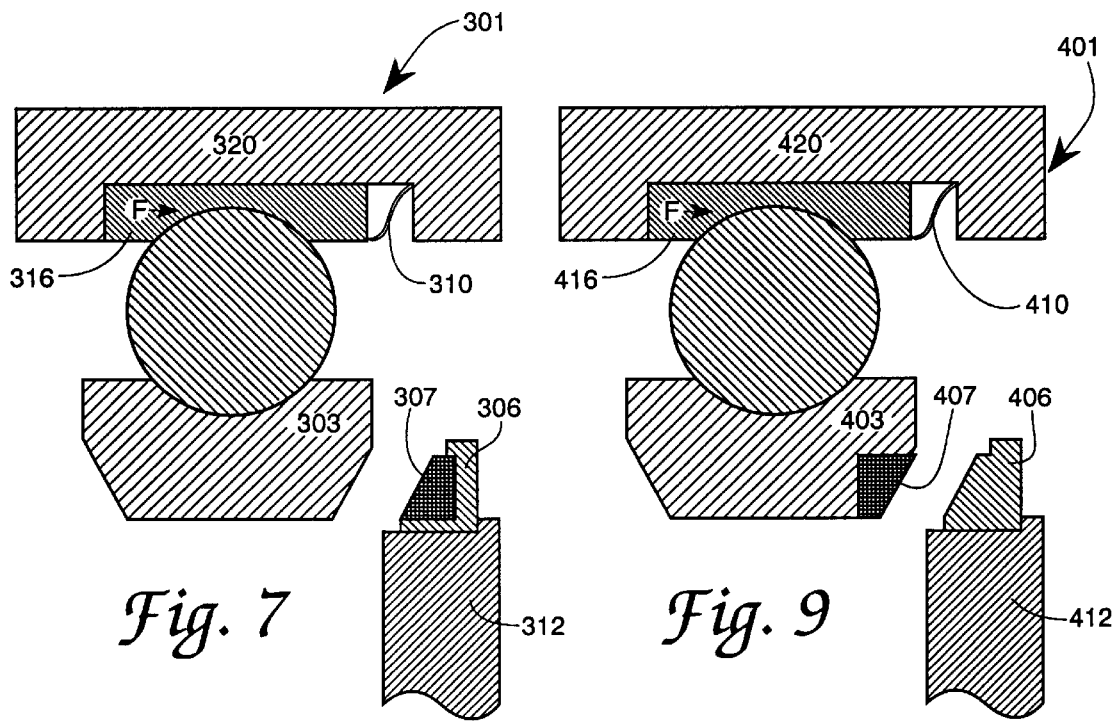
*Fig. 7*   *Fig. 9*
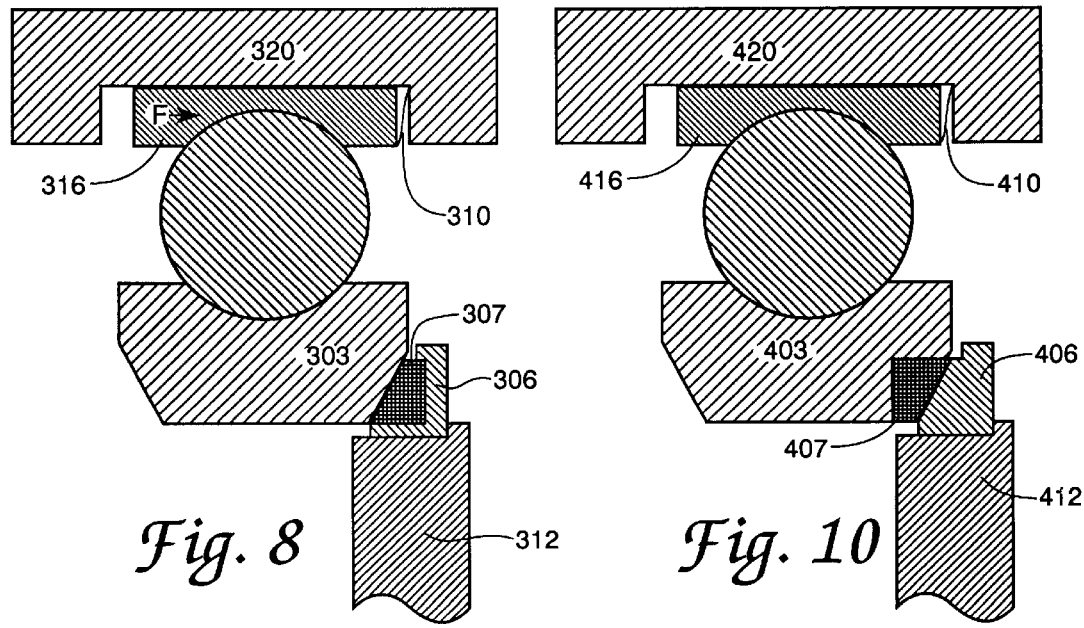
*Fig. 8*   *Fig. 10*

CARBON-CARBON CLUTCH BEARING ENGAGEMENT MECHANISM

RIGHTS OF THE GOVERNMENT

The invention described herein may be manufactured and used by or for the Government of the United States for all governmental purposes without the payment of any royalty.

BACKGROUND OF THE INVENTION

The present invention relates generally to clutch mechanisms for turbine engines, turbopumps and the like, and more particularly to a bearing engagement mechanism in a bidirectional conical carbon-carbon clutch structure.

Standard lubrication systems are being pushed to the limit in current turbine engines. Conventional rolling element bearings and liquid lubricants become unusable as the thrust-to-weight ratio for engines increase. One way to increase the temperature and speed capability of a bearing sump is by using magnetic bearings. To meet thrust-to-weight goals of advanced turbine engines, magnetic bearings are generally excessively large and heavy for handling short duration, high load maneuver conditions and auxiliary conventional rolling element bearings must be used to support the shaft.

Conventional rolling element bearings used as auxiliaries must have a clearance between the shaft and the inner race (0.005–0.010–0.020 inch diametral clearance) which is less than the magnetic bearing clearance. However, in the event of touchdown on the auxiliary bearings, this gap usually produces dynamic instability for the rotating shaft. An example of shaft instability is a condition known as backward whirl where the shaft bounces inside the tolerance of the inner race in a direction opposite to rolling. Additionally, when the auxiliary bearing is engaged the inner race tries to attain shaft speed instantaneously, resulting in skidding damage to the bearing. Simple sleeve bearings can be used to bring the shaft to a stop after a magnetic failure, but sleeve bearings are not adequate for a shared load condition because they experience high wear unless they are lubricated under a fully flooded condition of up to two gallons of lubricant per minute. This would necessitate a lubricant reservoir, pump, and cooler.

Continuously engaged rolling element bearings with softly mounted races have the problem of limited life since high temperature experimental lubrication schemes with marginal lubrication capability must be used. These high temperature experimental lubrication schemes produce high wear and bearing life is typically less than 30 hours.

Magnetically levitated rotors for aerospace turbine engines require auxiliary bearings for shaft support in case of magnetic bearing failure or overload. For engine applications a magnetic bearing system cannot be sized to handle full maneuver loads because it becomes unrealistically large and heavy. Thus, auxiliary bearings are required to handle loads above the capacity of the magnetic bearings. To use conventional rolling element bearings on an as-needed basis, means must be used to close the tolerance from a disengaged to an engaged status while centering the shaft. Closing the clearance around the shaft prevents backward whirl. Centering the shaft minimizes rotating unbalance. A relatively gradual acceleration of the bearing is required to avoid skidding damage and inertial welding. Ideally the rolling element bearing is brought up to speed quickly, in the order of a few seconds rather than almost instantaneously. The present invention allows a gradual startup of the auxiliary bearing through the use of a slip surface or clutch consisting of one or a pair of carbon-carbon clutch plates or rings. The clutching action of the present invention allows the bearing elements to come up to shaft speed gradually during engagement, thereby minimizing skidding damage. The closed clearance avoids backward whirl. The centering minimizes shaft unbalance.

The invention is a solution that uses a rolling element bearing and provides a gradual engagement to minimize skidding damage of the bearing, provides closed clearance to avoid backward whirl, and provides shaft centering to minimize rotating unbalanced loads.

An auxiliary bearing engagement mechanism using a carbon-carbon clutch enables the use of conventional rolling element bearings as auxiliary bearings for as-needed use in magnetically supported rotors. Rolling element bearings must have a gradual engagement and provide shaft centering. Conventional rolling element bearings with 0.005–0.010–0.020 inch diametral clearance between the shaft and bearings have been shown to be dynamically unstable with skidding damage, inertial welding, and a catastrophic backward whirl condition when used for auxiliary support.

It is therefore a principal object of the invention to provide an improved clutch mechanism.

It is a further object of the invention to provide an improved carbon-carbon clutch mechanism having particular utility within turbine engines, turbo pumps and the like.

It is another object of the invention to provide a novel bearing engagement mechanism in a bi-directional conical carbon-carbon clutch structure.

It is another object of the invention to allow a gradual startup of a conventional rolling element auxiliary bearing through the use of a slip surface or clutch consisting of one or a pair of carbon-carbon clutch plates or rings.

It is another object of the invention to allow conventional rolling bearing elements to come up to shaft speed while preventing skidding damage and rotor backward whirl.

These and other objects of the invention will become apparent in the detailed description of representative embodiments.

SUMMARY OF THE INVENTION

In accordance with the foregoing objects of the invention, a bearing engagement mechanism for a bi-directional conical carbon-carbon clutch for turbine engines, turbo pumps and the like is provided which includes a carbon-carbon clutch bearing engagement mechanism for the inner race of a rolling element bearing. The invention comprises a set of wave springs for axially urging the clutch into a non-engaged position, and guide means for guiding the clutch into an engaged position. The clutch includes a pair of conical carbon-carbon rings mounted in movable clutch ring housings. The guide means comprises opposing, contiguous pairs of non-parallel ball raceways and a ball positioned in both pairs of the ball raceways whereby relative rotation of the ball raceway pairs in opposite directions results in axial movement of the clutch ring housings in opposing axial directions. The carbon-carbon clutch provides a gradual engagement to minimize skidding damage of the bearing and provides shaft centering to eliminate the initial tolerance required to allow beneficial operation of the magnetic bearing while avoiding the backward whirl phenomenon.

DESCRIPTION OF THE DRAWINGS

FIG. 7 is a cross sectional view of a third embodiment of the invention in a disengaged state;

FIG. 8 is a cross sectional view of a third embodiment of the invention in an engaged state;

FIG. 9 is a cross sectional view of a fourth embodiment of the invention in a disengaged state;

FIG. 10 is a cross sectional view of a fourth embodiment of the invention in an engaged state;

DETAILED DESCRIPTION

Figure 1:
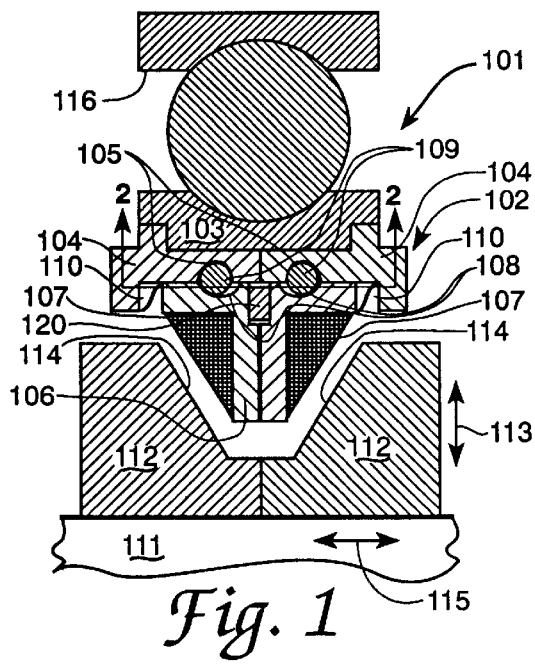
FIG. 1 is a cross sectional view of a first embodiment of the invention in a disengaged state.
Figure 2:
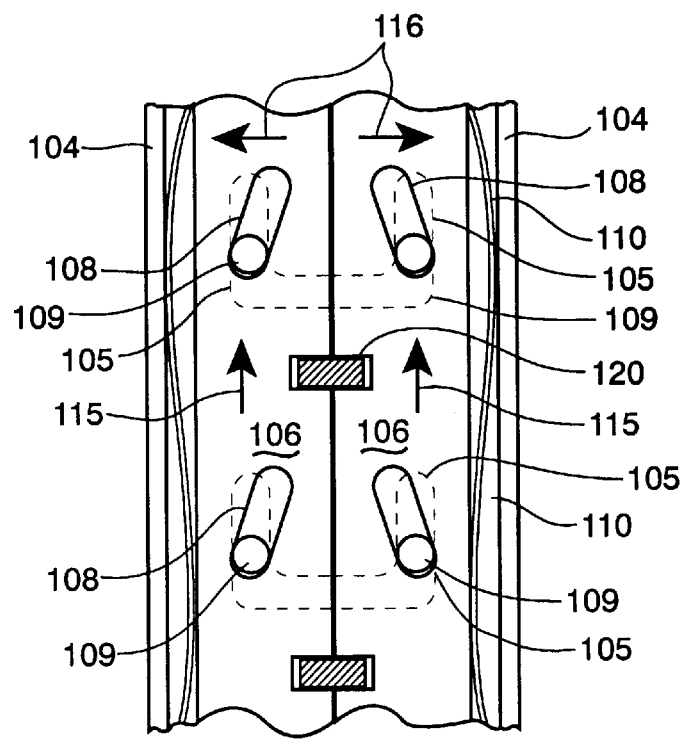
FIG. 2 is a flattened view of the arched portion of the housing of a first embodiment of the invention in a disengaged state.
Figure 4:
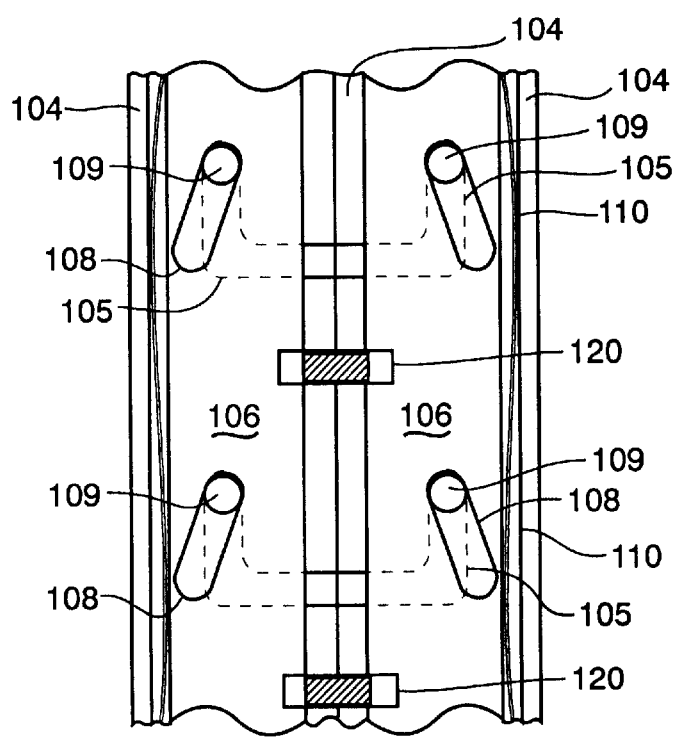
FIG. 4 is a flattened view of the arched portion of the housing of a first embodiment of the invention in an engaged state.

Referring now to FIG. 1, an axial cross sectional view of the essential components of a representative embodiment of the auxiliary carbon-carbon clutch bearing structure 101 of the present invention is shown. In this invention, carbon-carbon rings are used as high temperature clutch surfaces. Carbon-carbon clutch mechanism 102 is press fitted on bearing inner race 103 with mechanism housing pairs 104 in direct contact with bearing inner race 103. Outer bearing race 116 is press fit or otherwise hard mounted in an outer housing member not shown. Mechanism housing pairs 104 have U-shaped ball raceways 105 machined around the circumference. Clutch ring housing 106 holds carbon-carbon rings 107 and tangentially mates to mechanism housing 104. Referring to FIGS. 2 and 4, clutch ring housing 106 has ball raceways 108 machined around the circumference at approximately a 30° angle to the tangential portion of mechanism housing ball raceways 105. The axial positions of clutch ring housings 106 are controlled by axial movement balls 109, which set in ball raceways 105 and 108 of mechanism housings 104 and clutch ring housings 106 respectively. Clutch ring housings 106 are held in a non-engaged position shown in FIG. 2 by wave springs 110.

Figure 3:
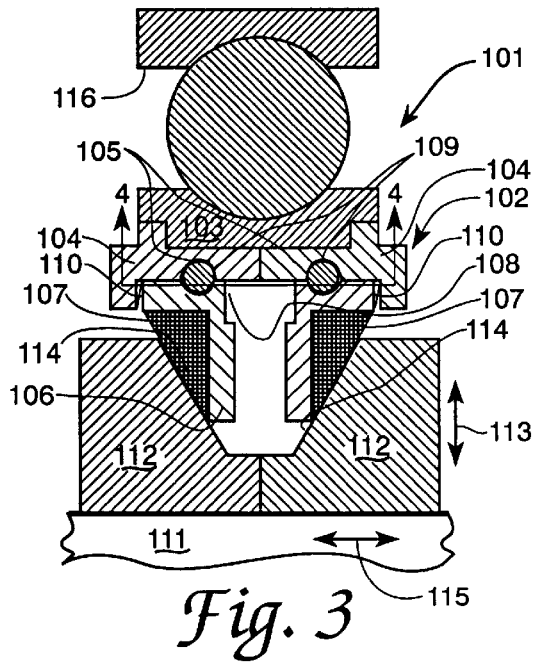
FIG. 3 is a cross sectional view of a first embodiment of the invention in an engaged state.

The above-described carbon-carbon clutch is located coaxial with shaft 111 and a pair of oppositely and contiguously situated shaft runners 112. As depicted in FIGS. 1 and 3, the pair of carbon-carbon rings 107 are tapered at approximate 45° with decreasing radii in a direction radially and axially inward of clutch ring housing 106. The pair of shaft runners 112 are accordingly tapered at a like angle as the corresponding carbon-carbon rings in order to mate with the carbon-carbon rings and to center shaft 111.

In operation shaft 111 is magnetically levitated with magnetic bearings located at opposite sides of auxiliary carbon-carbon clutch bearing 101. An aerospace turbine engines will, for example, require auxiliary carbon-carbon clutch bearing 101 for shaft support in case of magnetic bearing failure or overload. An overload could occur, for example, during a high torque turning maneuver. The clearance between carbon-carbon rings 107 and shaft runners 112 is exaggerated in the figures. Under normal operating conditions the shaft would be supported entirely by the magnetic bearing system with a small clearance between carbon-carbon rings 107 and shaft runners 112 on the order of 0.005–0.010 inches. If the shaft were to become unstable or exceed predetermined positional limits as indicated by two-way arrows 113 and 115, the axial shaft position controlled by a thrust magnetic bearing can axially force the carbon-carbon clutch to contact tapered mating surfaces 114 of shaft runners 112.

Initially shaft runners 112 slip on carbon-carbon clutch rings 107. The slip is controlled by the amount of axial or radial shaft load that requires support. Upon first contact inner race 103 begins to rotate in the same direction as shaft 111. During the slippage between the carbon-carbon clutch rings and shaft runners, fine powder portions of the carbon-carbon clutch rings are created by the frictional contact, thereby providing a lubricant. This lubricant acts as a prophylaxis against frictional welding and reduces heat generation. As the load on the auxiliary bearing increases the slip rate diminishes to zero and the auxiliary bearing achieves full shaft speed. The carbon-carbon clutch also centers the shaft geometrically through the active force of the shaft.

Referring again to FIGS. 2 and 4, as the load increases and the slip rate diminishes, clutch rings housings 106 move tangentially with respect to mechanism housing 104 as indicated by arrows 115. Axial movement balls 109 are co-located in both ball raceways 105 of mechanism housings 104 and ball raceways 108 of clutch ring housing 106. Because balls 109 travel in ball raceways 105 which are axially fixed and because ball raceways 108 are at an angle to the tangential portion of the mechanism housing ball raceways 105, clutch ring housings 106 are forced apart from one-another in opposite axial directions as indicated by arrows 116. Prior to contact of carbon-carbon rings 107 with shaft runner surface 114, the clutch ring housings are maintained in mutual contact by wave springs 110 as depicted in FIG. 2. During employment of the auxiliary bearing, wave springs 110 remain compressed as depicted in FIG. 4.

As stated in the previous paragraph, as clutch ring housings 106 rotate they move axially as balls 109 roll through ball raceways 105 and 108 machined at an angle in the clutch ring housing. Both rings rotate together through the action of the anti-rotation device 120 as they move axially outward toward the shaft runners. The outward movement continues until both carbon-carbon rings are contacting the runners and the shaft is centered due to the tapered geometry of the carbon-carbon rings and the shaft runners. Additional force from the shaft now translates directly through the auxiliary rolling bearing of the present invention. When the overload force diminishes, the mechanism will reverse its previous action due to the force of wave springs 110 and the clutch will disengage the runner as the springs push clutch ring housings 106 and carbon-carbon rings 107 mounted therein back to the initial non-engaged position.

Figure 5:
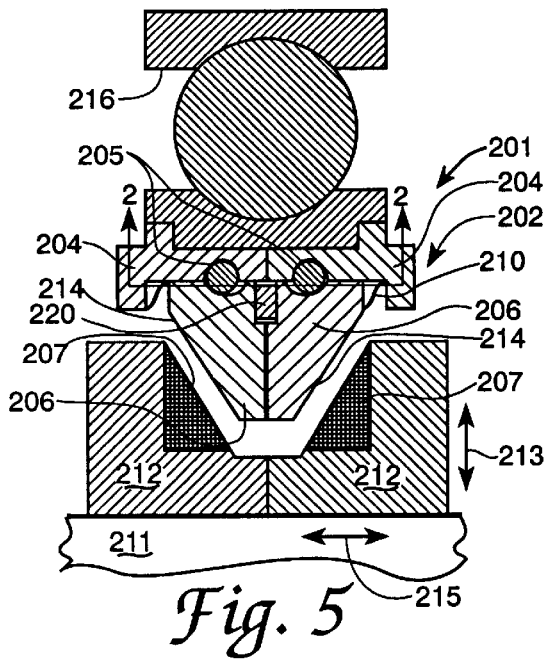
FIG. 5 is a cross sectional view of a second embodiment of the invention in a disengaged state.
Figure 6:
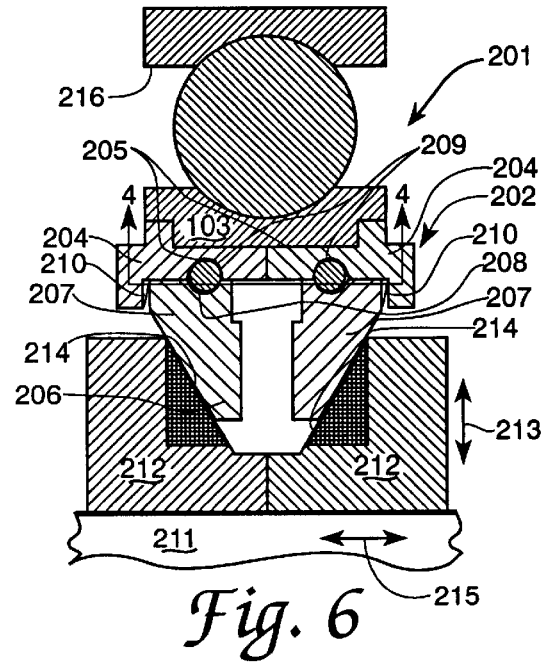
FIG. 6 is a cross sectional view of a second embodiment of the invention in an engaged state.

Referring to FIGS. 5 and 6, a second embodiment of carbon-carbon clutch bearing 201 may be effected by reversing the location of carbon-carbon rings 207 by mounting carbon-carbon rings 207 in shaft runners 212. The invention represented by the second embodiment would function in all other respects as the first embodiment functions.

Referring to FIGS. 7 and 8, a third embodiment of clutch bearing 301 is depicted. In this third embodiment of the invention, outer auxiliary bearing race 316 is soft mounted in outer housing 320. The soft mounting allows the axial position of outer race 320 to be changed by an engagement force F which could be provided by an electrical, hydraulic or pneumatic actuator in a well-known manner. Magnetic bearing are controlled by feeding back the shaft position as an input to the magnetic bearing controller which converts the shaft displacement from centerline to a force requirement that is output to the magnetic bearing via changes in voltage and current. Therefore, since shaft position is know and mechanical clearance is know, limits of the shaft position may be established that would trigger auxiliary bearing actuation. The engagement actuator could be part of the magnetic bearing system and be controlled by the magnetic bearing controlling or it could have its own controlling with shaft position sensors. When the shaft position limits were exceeded the engagement actuator would be signaled to move the outer race from an non-engaged position shown in FIG. 7 to an engaged position shown in FIG. 8. In this third embodiment a single carbon-carbon ring 307 is mounted in clutch ring housing 306 which is in turn mounted on shaft runner 312. As engagement force F moves outer race 316 in an axial direction towards carbon-carbon ring 307, inner race 303 is forced into contact with carbon-carbon ring 307. Auxiliary rolling bearing 301 assumes a support role for a shaft (not shown) which supports shaft runner 312 as in the first embodiment. As in the first embodiment, when the overload force diminishes, the mechanism will reverse its previous action due to the force of wave springs 310 and disengage the runner as the springs push outer race 316 to the initial non-engaged position.

Referring to FIGS. 9 and 10, a fourth embodiment of carbon-carbon clutch bearing 401 may be effected by reversing the location of the carbon-carbon rings 407 by mounting the carbon-carbon rings 407 in the rolling bearing outer race 403. The invention represented by the fourth embodiment would function in all other respects as the third embodiment functions.

Figure 11:
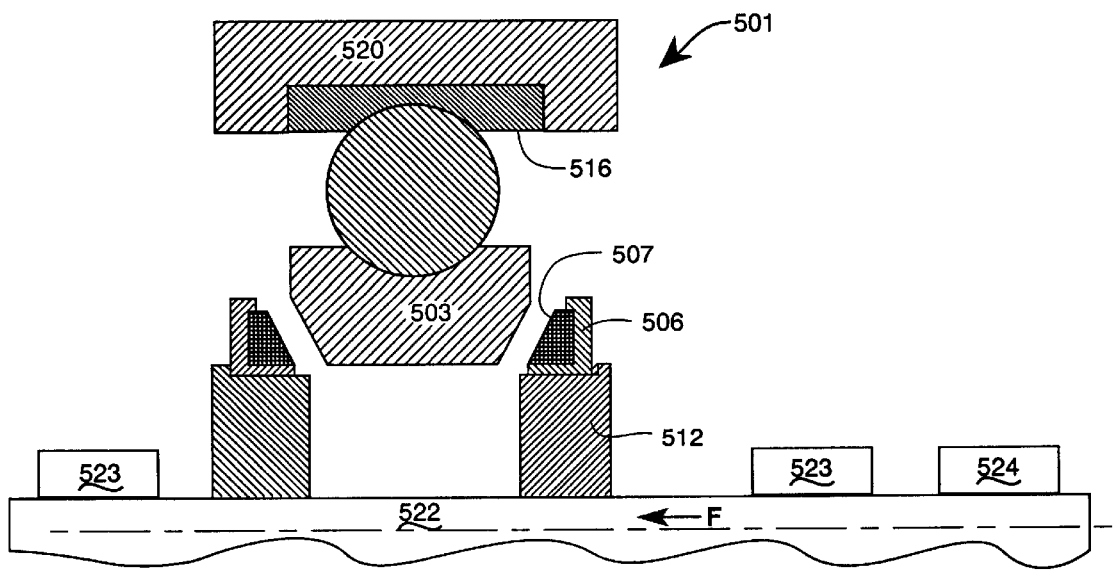
FIG. 11 is a cross sectional view of a fifth embodiment of the invention in a disengaged state.
Figure 12:
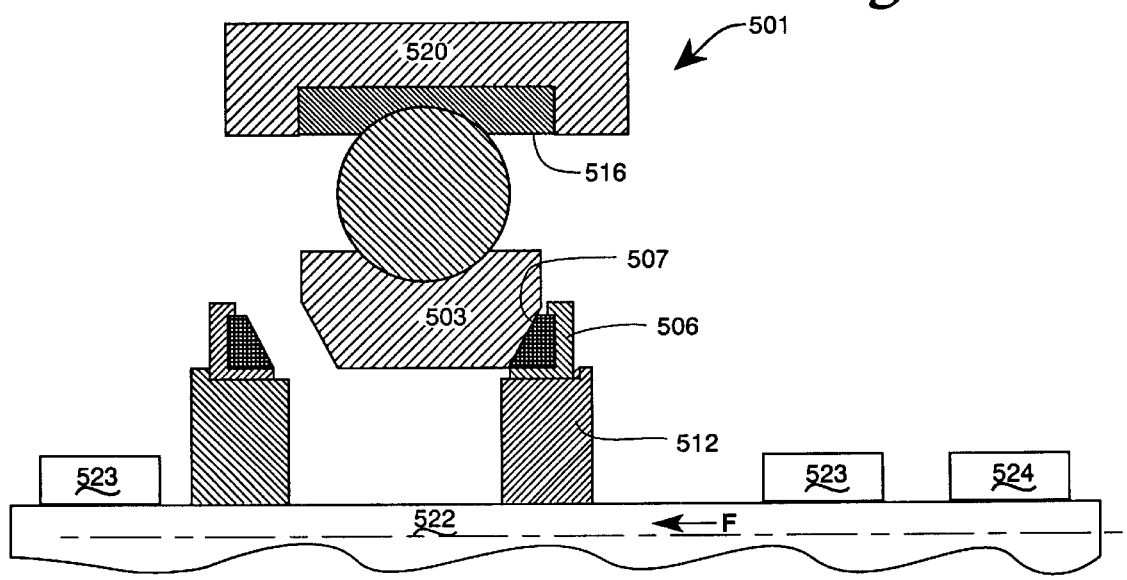
FIG. 12 is a cross sectional view of a fifth embodiment of the invention in an engaged state.

Referring to FIGS. 11 and 12, a fifth embodiment of clutch bearing 501 is depicted. In this fifth embodiment of the invention outer auxiliary bearing race 516 is hard mounted in outer housing 520. Carbon-carbon clutch ring 507 is mounted through clutch ring housing 506 and disk or shaft runner 512 to shaft 522. Under normal operating conditions shaft 522 would be supported entirely by magnetic bearings with a small clearance, on the order of 0.005–0.010 inches, between carbon-carbon clutch ring 507 and tapered inner race 503. The magnetic bearing supporting thrust loads would control the engagement. If the rotor were to become unstable or exceeded predetermined positional limits, the axial shaft position controlled by thrust magnetic bearing 524 could allow the force F of the turbine engine to cause axial displacement of shaft 522 and subsequent contact of the carbon-carbon clutch 507 and tapered inner race 503. This approach allows a considerably simpler mechanical design.

Figure 13:
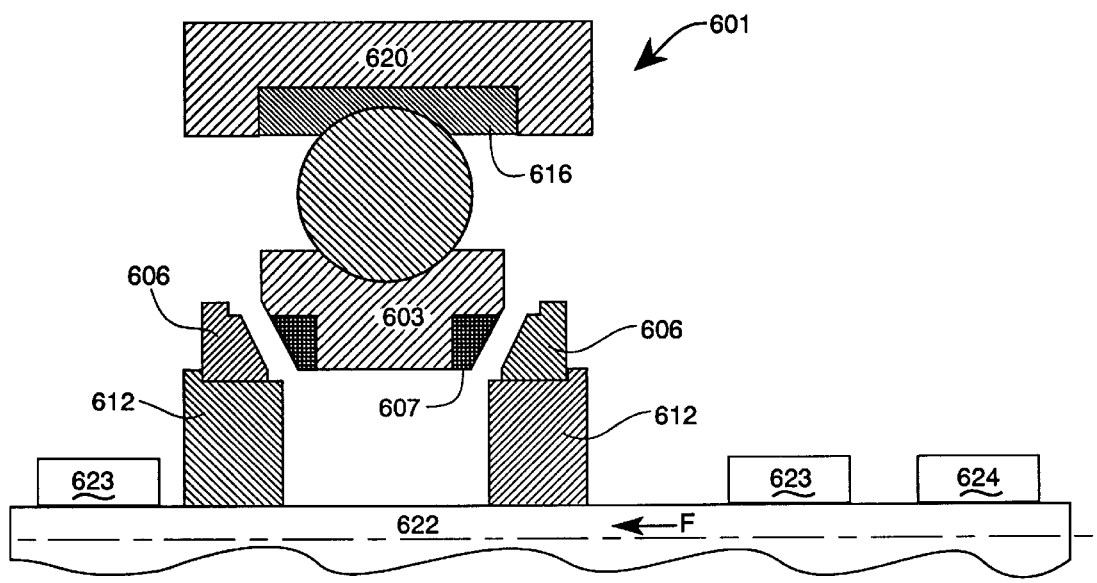
FIG. 13 is a cross sectional view of a sixth embodiment of the invention in a disengaged state.
Figure 14:
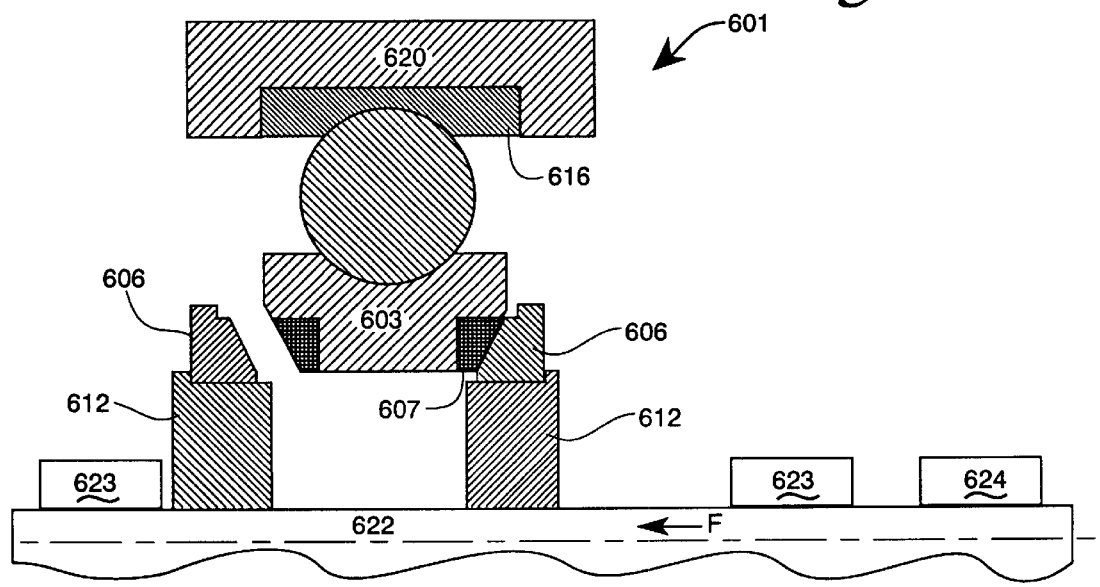
FIG. 14 is a cross sectional view of a sixth embodiment of the invention in an engaged state.

Referring to FIGS. 13 and 14, a sixth embodiment of carbon-carbon clutch bearing 601 may be effected by reversing the location of carbon-carbon rings 607 by mounting carbon-carbon rings 607 in rolling bearing outer race 603. The invention represented by this sixth embodiment would function in all other respects as the fifth embodiment functions.

Our invention provides a novel bearing engagement mechanism in a bidirectional conical carbon-carbon clutch structure. While the above description contains many specificities, these should not be construed as limitations of the scope of the invention, but rather as an exemplification of preferred embodiments thereof. Modifications to the invention may be made as might occur to one with skill in the field of the invention within the scope of the appended claims. All embodiments contemplated hereunder that achieve the objects of the invention have therefore not been shown in complete detail. Other embodiments may be developed without departing from the spirit of the invention or from the scope of the appended claims.

Many other variations are possible. For example, the mechanism as described uses a 45° angle for the carbon-carbon ring and shaft runner interface which provides equal displacement before engagement in both the radial and axial directions. This angle can be changed to tune the mechanism for either axial or radial direction operation which is within the spirit of this invention. Also, by altering the engagement area of the carbon-carbon rings, the engagement speed and required force to attain equal bearing and shaft speed can be modified. Furthermore, the angle of ball raceways 105 and/or 108 could be altered. Accordingly, the scope of the invention should be determined not by the embodiments illustrated, but by the appended claims and their legal equivalents.

We claim:

1. A bearing engagement mechanism for a rolling element bearing comprising:
   a rolling element bearing comprising an inner and outer race;
   a rolling element bearing housing;
   a radially inward and an axially outward edge of the inner race being tapered;
   a shaft runner being tapered at a like angle of taper as the inner race taper; and,
   the radially inward and axially outward edge of the inner race being situated in near contact to the shaft runner.

2. The mechanism of claim 1, further comprising a carbon-carbon ring mounted on the shaft runner, the carbon-carbon ring being tapered at a like angle of taper as the inner race angle of taper.

3. The mechanism of claim 1, further comprising a carbon-carbon ring mounted on the inner race of the rolling element bearing, the carbon-carbon ring being tapered at a like angle of taper as the shaft runner angle of taper.

4. A bearing system for supporting a rotating shaft on a housing, comprising:
   a pair of primary bearings and one or more auxiliary bearings, the auxiliary bearing comprising an outer race, an inner race located adjacent and coaxial to the shaft, a plurality of rolling elements disposed between the races, and a retainer ring for constraining the rolling elements;
   an axially outward end of the inner race being tapered;
   the primary bearings being operative to support the shaft during normal operation in a first shaft position such that in the auxiliary bearing system, the inner race is in near contact with a shaft runner securely attached to the shaft; and
   the auxiliary bearing being configured so that upon sufficient axial and/or radial displacement of the shaft in a direction from the first shaft position to a second shaft position the inner race contacts the shaft runner whereby the shaft is supported by the auxiliary bearing.

5. The mechanism of claim 4 further, comprising a shaft runner being tapered at a like angle of taper as the inner race taper.

6. The mechanism of claim 5 further, comprising a carbon-carbon ring mounted on the shaft runner, the carbon-carbon ring being tapered at a like angle of taper as the inner race angle of taper.

7. The mechanism of claim 5 further, comprising a carbon-carbon ring mounted on the inner race of the rolling element bearing, the carbon-carbon ring being tapered at a like angle of taper as the shaft runner angle of taper.

8. The bearing system in accordance with claim 5 wherein the primary bearings are magnetic bearings.

9. A bearing system for supporting an axially loaded shaft on a housing, the bearing system comprising:
  a pair of primary bearings for supporting the shaft under normal conditions during which the shaft rotates in a first axial and radial position, each primary bearing being fixedly mounted on the housing;
  at least one auxiliary bearing for supporting and centering the shaft in a second axial and/or radial position upon failure of at least one of the primary bearings;
  the auxiliary bearing comprising a ball bearing having an outer race, an inner race, and a plurality of balls there between, and wherein the inner races is configured so that when the shaft is in the first position, the inner race in not in contact with the shaft; and,
  an axially outward end of the inner-race being tapered.

10. The mechanism of claim 9, further comprising a shaft runner being tapered at a like angle of taper as the inner race taper.

11. The mechanism of claim 10, further comprising a carbon-carbon ring mounted on the shaft runner, the carbon-carbon ring being tapered at a like angle of taper as the inner race angle of taper.

12. The mechanism of claim 10, further comprising a carbon-carbon ring mounted on the inner race of the rolling element bearing, the carbon-carbon ring being tapered at a like angle of taper as the shaft runner angle of taper.

13. A bearing engagement mechanism for a rolling element bearing comprising:
  a rolling element bearing comprising an inner and outer race;
  a rolling element bearing housing;
  the bearing outer race being soft mounted in the bearing housing;
  a carbon-carbon ring being mounted on the inner race of the rolling element bearing;
  means for axially urging the rolling element bearing in one axial direction; and
  means for moving the rolling element bearing in a second axial direction.

14. The mechanism of claim 13 wherein the carbon-carbon ring is inwardly tapered towards the axial and radial center of the rolling element bearing.

15. The mechanism of claim 14 further including:
  (a) a shaft located coaxial with and within the rolling element bearing; and
  (b) a shaft runner located on the shaft adjacent the rolling element bearing;
  (c) the shaft runner being inwardly tapered towards the axial and radial center of the rolling element bearing at a like angle of taper as the carbon-carbon ring taper.

16. A bearing engagement mechanism for a rolling element bearing comprising:
  a rolling element bearing comprising an inner and outer race;
  the inner race being inwardly tapered towards the axial and radial center of the rolling element bearing;
  a rolling element bearing housing;
  the bearing outer race being soft mounted in the bearing housing;
  a shaft located coaxial with and within the rolling element bearing;
  a shaft runner located on the shaft adjacent the rolling element bearing;
  a carbon-carbon ring mounted on the shaft runner, the carbon-carbon ring being inwardly tapered towards the axial and radial center of the rolling element bearing at a like angle of taper as the inner race taper;
  means for axially urging the rolling element bearing in one axial direction;
  means for moving the rolling element bearing in a second axial direction.

* * * * *